May 14, 1940.                    G. SCHEERER                    2,201,014
         ARRANGEMENT FOR DRAWING FUEL OUT OF THE INDUCTION
                CONDUIT OF INTERNAL COMBUSTION ENGINES
                         Filed June 8, 1939
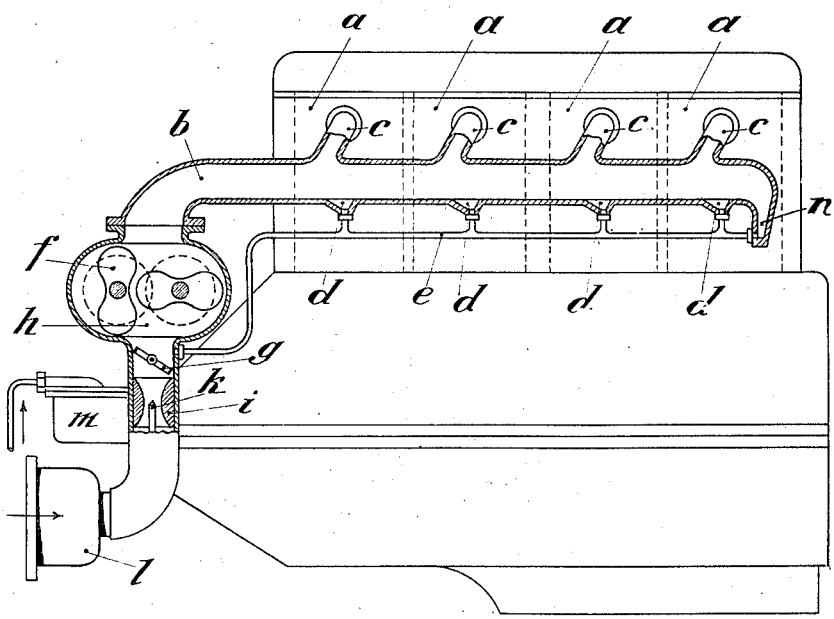
Georg Scheerer
        Inventor:
By
    his ATT'Y.

Patented May 14, 1940

2,201,014

UNITED STATES PATENT OFFICE 2,201,014

ARRANGEMENT FOR DRAWING FUEL OUT OF THE INDUCTION CONDUIT OF INTERNAL COMBUSTION ENGINES

Georg Scheerer, Stuttgart-Bad-Cannstatt, Germany, assignor to Daimler-Benz Aktiengesellschaft, Stuttgart-Unterturkheim, Germany Application June 8, 1938, Serial No. 212,525
In Germany June 9, 1937

4 Claims. (Cl. 123—119)

This invention relates to an arrangement for drawing fuel out of the induction conduit of internal combustion engines with charging blower, and it has for its object to prevent the sparking plugs from becoming wet and consequently the operation of the engine being disturbed by excess fuel during service, especially under light load and when running idle.

In internal combustion engines with charging blower, in which the charging blower is arranged between the carburettor and the engine cylinders, the induction conduit is chosen with very large cross-sectional area so that, in spite of the large quantities of mixture delivered by the charging blower, the speed in the induction conduit can be kept low. These large induction conduits are, however, open to the objection that, especially under light load and when running idle, relatively large quantities of fuel deposit in the conduit and the sparking plugs become wet. The result of this is, that sparking trouble occurs and the operation of the engine becomes irregular or even interrupted entirely.

These objections are overcome according to the invention in that in the induction conduit catching devices of any shape are arranged from which the deposited excess fuel is sucked. The catching devices are devices outside from the cross-section of the conduit and branch off from the conduit at the bottom of the latter. The fuel collected in the catching devices may be either drawn off by the superpressure in the conduit or by the suction of the charging blower or by a separate pump. The catching devices which may be constructed for example as pocket-like depressions, are all connected by a common conduit communicating with the suction chamber of the charging blower or the pump. Preferably the catching devices are provided at spots of the conduit where whirls occur.

As experience has shown that the greatest quantity of fuel deposits and collects on the cylinders situated farthest towards the rear and this impairs the operation of the sparking plugs, the end of the induction conduit, i. e., the part of the conduit which has the greatest distance from the carburettor, is constructed as a separate collecting trap from which the deposited fuel is sucked in the same manner as from the catching pockets. The separate collecting trap is preferably provided at the bottom of the conduit.

An embodiment of the invention is illustrated diagrammatically in the accompanying drawing.

The fuel-air mixture is fed to the cylinders $a$ by the charging blower $f$ through the main induction conduit $b$ and the branch conduits $c$. The air sucked in through the pipe $l$ takes up fuel at the throttle point $t$ from the nozzle $k$ connected with the float chamber $m$. The fuel-air mixture is sucked through the adjustable throttle valve $g$ and conduit $h$ by the charging blower $f$ and forced into the induction conduit $b$ whence it is fed to the cylinders $a$. When the engine is running under light load or idle, the excess fuel flows off on the walls of the induction conduit $b$ and collects in the pocket-like depressions $d$ arranged at the lowest points. From these depressions the fuel is sucked by the charging blower $f$ through the conduit $e$ and again mixes with the charge mixture. At the end of the induction conduit $b$ a separate trap $n$ is arranged from which the collected excess fuel is also drawn off through the conduit $e$ by the suction action of the charging blower $f$.

Also separate catching plates or similar elements may be provided in the lower portion of the induction conduit $b$ for catching the fuel, instead of the catching devices in the form of pocket-like depressions $d$ illustrated.

Having now particularly described and ascertained the nature of my said invention and in what manner the same is to be performed, I declare that what I claim is:

1. In a combustion engine, the combination with a carburetor, an intake manifold of relatively wide cross-section and a charging blower between said carburetor and said manifold, of catching devices for the fuel condensate disposed in said manifold, one of said catching devices being disposed at the end of said manifold remote from said charging blower.

2. In a combustion engine, the combination with a carburetor, an intake manifold of relatively wide cross-section and a charging blower between said carburetor and said manifold of fuel condensate catching depressions provided at the bottom of said manifold, and a common pipe connecting the lower ends of all said depressions and leading to the suction side of said blower, one of said depressions being disposed at the end of said manifold remote from said blower.

3. An arrangement, as claimed in claim 2, in which said end depression is of a greater depth than the rest of the depressions.

4. In a multi-cylinder combustion engine, the combination with a carburetor, an intake manifold of relatively wide cross-section including a branch conduit for each cylinder, and a charging blower between said carburetor and said manifold, of a plurality of fuel condensate depressions, provided at the bottom of said manifold opposite said branch conduits, respectively, and an additional fuel condensate catching depressions at the end of said manifold remote from said blower.

GEORG SCHEERER.